(No Model.)

J. C. BUZZELL.
CATTLE FASTENING.

No. 310,984. Patented Jan. 20, 1885.

Witnesses
S. N. Piper
E. B. Pratt

Inventor.
James Crosby Buzzell
by R. H. Eddy atty.

UNITED STATES PATENT OFFICE.

JAMES C. BUZZELL, OF ACTON, MAINE.

CATTLE-FASTENING.

SPECIFICATION forming part of Letters Patent No. 310,984, dated January 20, 1885.

Application filed May 12, 1884. (No model.)

*To all whom it may concern:*

Be it known that I, JAMES CROSBY BUZZELL, of Acton, in the county of York, of the State of Maine, have invented a new and useful Improvement in Cattle-Fastenings; and I do hereby declare the same to be described in the following specification and represented in the accompanying drawings, of which—

Figure 1:
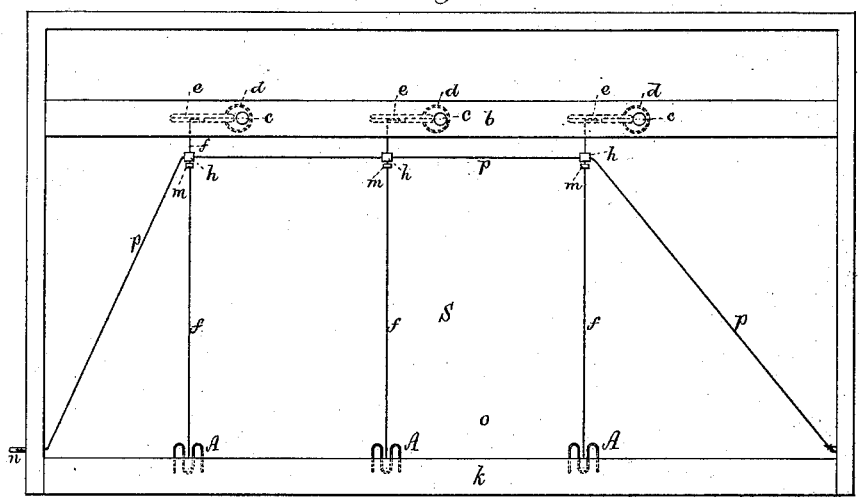
Figure 2:
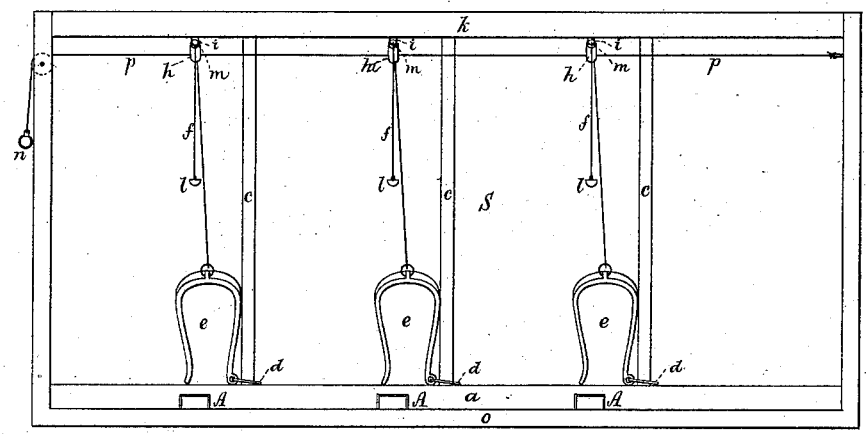
Figure 3:
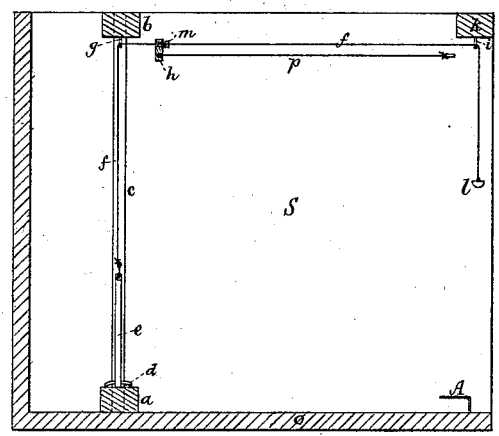

Figure 1 is a top view, Fig. 2 a front elevation, and Fig. 3 a transverse section, of a cattle-stall provided with my invention, the nature of which is defined in the claims hereinafter presented.

The invention is for readily securing cattle in a stall, barn, or car, and relieving one or more of them, separating or simultaneously relieving all of them, as occasion may require.

In the drawings, S represents a cattle-stall, in which $a$ and $b$ denote two horizontal beams connected by a series of vertical stanchions, posts, or bars, $c$, arranged at suitable distances apart. Each bar $c$ has adapted to slide upward and downward freely upon it a ring, $d$, jointed to a hook or bow, $e$, formed to straddle and extend down the neck of an ox or other animal to be stalled. From each hook or bow a line or rope, $f$, goes upward and through a staple or guide, $g$, projecting from the beam $b$. Thence the line is carried through a block or leader, $h$, to and through another staple or guide, $i$, fixed in a horizontal beam, $k$, disposed with respect to the beam $b$ in manner as represented, there being a knob or weight, $l$, fixed to the line at its free end. There is also fixed to the line, near the leader, a stop or round block, $m$. By means of the lines $f$ the several bows may be separately raised or lowered, and when at their highest positions may be held there by passing into staples A, formed and arranged in the floor $o$, as shown, the lines so that their knobs shall be held by such staples from being drawn upward by the weight of the bows. Furthermore, a line, $p$, fastened at one end to one of the ends of the stall, passes freely through all the leaders, and thence through a hole on the other side of the stall, and is attached to a ring, $n$. On taking hold of such ring and pulling it downward, all the leaders will be simultaneously drawn backward against the stops, and with them will cause the several bows to be raised upward or off the necks of cattle stalled and secured by such bows.

An ox or animal, on being stalled and secured by one of the bows, can freely raise or lower his head, or can stand up or lie down, the bow on his neck presenting no material obstruction to his so doing.

As a device for fastening cattle, I do not claim a stanchion bent and provided with a sliding collar, as represented in the United States Patent No. 257,172, such collar being simply a strap provided with a buckle, which requires it to be buckled by hand about the neck of an animal, whereas with my improvement the bow has to be simply dropped on the neck so as to embrace it. With the bow there is no danger of choking or impeding the breathing of the animal when in a recumbent position.

I claim—

1. The combination, with the stanchion or vertical post of a cattle-stall, of a ring and a bow or hook, and the operative line and its guides, arranged as set forth.

2. The combination of the line $p$ and its leaders $h$ with the cattle-securing bows $e$, applied to stanchions or posts $c$, as described, and with the raising-lines $f$, connected with the said bows and provided with stops $m$, and led through staples or guides, all being substantially and for the purposes as represented.

3. The series of line holders or staples A, as shown, projecting upward from the floor of the stall, in combination with the series of bows $e$, and their raising-lines $f$, provided with knobs or weights to operate such staples, as set forth, such bows being held by rings, as described, to posts or stanchions arranged in the stalls, as represented.

JAMES C. BUZZELL.

Witnesses:
R. H. EDDY,
E. B. PRATT.